United States Patent
Burenga

(10) Patent No.: US 9,968,035 B2
(45) Date of Patent: May 15, 2018

(54) BALE SPEAR DEVICE

(71) Applicant: Thomas I Burenga, Litchfield, IL (US)

(72) Inventor: Thomas I Burenga, Litchfield, IL (US)

(73) Assignee: Worksaver, Inc., Litchfield, IL (US)

( * ) Notice: Subject to any disclaimer, the term of this patent is extended or adjusted under 35 U.S.C. 154(b) by 0 days. days.

(21) Appl. No.: 15/330,735

(22) Filed: Oct. 31, 2016

(65) Prior Publication Data

US 2017/0127616 A1    May 11, 2017

Related U.S. Application Data

(60) Provisional application No. 62/285,949, filed on Nov. 10, 2015.

(51) Int. Cl.
*A01D 87/12*    (2006.01)
*B66F 9/12*    (2006.01)
*E02F 3/40*    (2006.01)

(52) U.S. Cl.
CPC ......... *A01D 87/122* (2013.01); *Y10S 414/125* (2013.01)

(58) Field of Classification Search
CPC .............................. A01D 87/127; A01F 25/14
See application file for complete search history.

(56) References Cited

U.S. PATENT DOCUMENTS

| | | | |
|---|---|---|---|
| 3,995,594 A | 12/1976 | Rose | |
| D243,326 S * | 2/1977 | Vandewater | D15/28 |
| 4,015,739 A | 4/1977 | Cox | |
| 4,027,773 A | 6/1977 | Kenworthy | |
| 4,090,616 A | 5/1978 | Runyan et al. | |
| 4,099,629 A | 7/1978 | Cox | |
| 4,120,405 A * | 10/1978 | Jones | A01D 87/127 414/24.5 |
| 4,674,786 A * | 6/1987 | Lynch | A01D 87/127 294/120 |
| 5,016,350 A | 5/1991 | Burenga | |
| 5,651,653 A | 7/1997 | Bablo | |
| 6,663,337 B2 | 12/2003 | Westendorf et al. | |
| 6,848,883 B2 | 2/2005 | Atencio | |

(Continued)

FOREIGN PATENT DOCUMENTS

| | | | | |
|---|---|---|---|---|
| BR | 102012032637 A * | 9/2014 | | B55F 8/18 |
| CA | 1189030 A1 * | 6/1985 | | A01D 87/127 |

(Continued)

*Primary Examiner* — Gregory W Adams
(74) *Attorney, Agent, or Firm* — Paul M. Denk

(57) ABSTRACT

A bale spear device has a first upper plate having an aperture, a second upper plate having an aperture, an upper cross tube for connecting the first upper plate and the second upper plate together in a spaced apart arrangement, a first lower plate connected to the upper cross tube, a second lower plate connected to the upper cross tube, a lower cross tube for connecting the first lower plate and the second lower plate together in a spaced apart relationship, a socket extending out of the upper cross tube, a spear having a tip end and a socket end with the tip end for insertion into the aperture of the second upper plate and the socket end for insertion into the aperture of the first upper plate, and a locking device for locking the socket end of the spear in the aperture of the first upper plate.

20 Claims, 7 Drawing Sheets

(56) References Cited

U.S. PATENT DOCUMENTS

| | | | |
|---|---|---|---|
| 7,950,895 B2 * | 5/2011 | Burenga | A01D 87/127 37/405 |
| 8,061,956 B2 | 11/2011 | Burenga | |
| 8,684,655 B2 * | 4/2014 | Cannon | A01D 87/127 414/24.5 |
| 8,763,226 B1 | 7/2014 | Gustafson | |
| 8,764,369 B2 | 7/2014 | Bowne | |
| 8,777,546 B2 | 7/2014 | Lanting et al. | |
| RE46,048 E | 7/2016 | Burenga | |
| 2002/0106272 A1 | 8/2002 | Westendorf et al. | |
| 2003/0123956 A1 * | 7/2003 | Noualy | A01D 87/127 414/24.5 |
| 2004/0126217 A1 | 7/2004 | Westendorf et al. | |
| 2006/0120847 A1 | 6/2006 | Westendorf et al. | |
| 2009/0129894 A1 | 5/2009 | Burenga | |
| 2009/0129895 A1 | 5/2009 | Burenga | |
| 2011/0271647 A1 | 11/2011 | Horst | |
| 2013/0028686 A1 | 1/2013 | Bowne | |

FOREIGN PATENT DOCUMENTS

| | | | | |
|---|---|---|---|---|
| DE | 3608701 A1 * | 9/1987 | | A01D 9/00 |
| GB | 2442720 A * | 4/2008 | | A01D 87/127 |
| WO | WO8906499 A * | 7/1989 | | A01D 87/00 |

* cited by examiner

BALE SPEAR DEVICE

CROSS REFERENCE TO RELATED APPLICATION

This non-provisional patent application claims priority to the provisional patent application having Ser. No. 62/285,949, filed on Nov. 10, 2015.

FIELD OF THE DISCLOSURE

This disclosure generally relates to a bale spear device, and more particularly to a bale spear device that is capable of storing one or more spears for transportation of the bale spear device.

BACKGROUND

Farmers raise crops of various kinds including hay, alfalfa, and cotton that are baled for storage, handling, and transportation. The bales usually bind the dried crops, such as hay, into a stacked form such as a rectangle or a round cylinder. Bales are generally made by a machine towed, or propelled, by the farmer at the time of harvesting the crop, such as hay in the summer. Hay, once baled, is used as feed for livestock. The hay bales can be loaded and transported for various uses and to many locations.

Round bales have seen increasing usage over the years. The round bales are formed from hay, or another crop, are collected in windrows and then rolled into a cylinder with flat ends by machine. The cylinders are then spaced along the path of travel of a baling machine, often towed behind a tractor. A farmer can leave the bales in place until needed or the farmer can move the bales. Bales can be collected and stored for the farmer's own use or sold to other users of the bales. However, a round bale can weigh upwards of 1500 pounds.

Generally bales are moved using forklifts, cranes, and other material handling equipment. Such equipment though has proven expensive to members of the farming community and less suited to rugged conditions encountered in the fields. Farmers seek to utilize equipment adept on fields and rugged locales in new ways. Such equipment includes the skid steer loader. Farmers use skid steer loaders for a whole host of activities limited only by the attachments available. Generally skid steer loaders have a chassis with a roll cage to protect the farmer. Upon the chassis, the farmer sits in the seat with the engine and the fuel tank behind the farmer. The wheels, or sometimes treads, are beside the seat and the hydraulic arms extend from the chassis near the engine, along side the roll cage, and in front of the roll cage. In usage, the farmer sits in the skid steer loader to operate it and watches the hydraulic arms lift and manipulate load in front of the farmer. Over the years, various manufacturers have made devices that attach to the arms of a skid steer loader. The devices include post hole diggers, hydraulic picks and hammers, hydraulic saws, fork lifts, lift baskets, buckets, snowplows, rotary brushes, and a whole host of others. The various devices attach to the arms using a common plate and hook across the arms and nearby hydraulic fitting. The common plate and hooks are now known as the Universal Skid Steer Quick Attach.

Though skid steer loaders are adept and versatile equipment on farms, farmers and ranchers still use tractors for various tasks. Tractors and skid steer loaders have bucket attachments upon the front. The bucket generally scoops up material and lifts it to a higher height, often for dumping into a pile or onto a truck. As a lifting attachment, buckets can also move bales placed inside them by farm hands. Buckets attach to the arms of tractor using pins following the tractor manufacturer's layout of the arms and arrangement of connectors. With many tractor manufacturers selling tractors, variations in connections have occurred. Device manufacturers thus make versions of the same device suitable for connection to different makes of tractor. In recent years however, farm tractor and front loader manufacturers reached agreement to standardized how devices would connect to the lifting arms of tractors. On tractors having 80 horsepower (hp) or less the farm tractor and front loader manufacturers adopted the Universal Skid Steer Quick Attach as a standard for the products of their industries. On tractors above 80 hp, the manufacturers use a European design known as Euro or Global type attachment. Manufacturers can now make devices that fit both tractors and skid steer loaders without individual models for brands.

One of the devices that manufacturers have produced over the years is a bale spear. The bale spear can be attached to a skid steer loader or a tractor and is used to spear a bale of hay to lift the bale and move the bale to a different location. The bale spear typically has one or more spears that are connected to a base plate or attachment frame. One problem associated with the bale spear is that when being transported the spear is subject to being lost. For example, bale spears may be shipped in which the attachment frames are placed on one pallet and the spears are placed on a different pallet. During shipping, steel banding holding the spears on the pallet may come lose and the spears may be lost. Another problem is that a large order of bale spears requires that the correct number of spears be shipped. In particular, some bale spears have one spear and other bale spears have two or more spears. As can be appreciated, the correct number of spears must be shipped with the different attachment frames. If the incorrect number is shipped then a customer may have to wait for one or more spears to be shipped.

The present disclosure is designed to obviate and overcome many of the disadvantages and shortcomings experienced with prior bale spear devices. Moreover, the present disclosure is related to a bale spear device that incorporates a storage device for transporting the bale spear device. Also, it would be advantageous to have a bale spear device that stores the correct number of spears.

SUMMARY OF THE DISCLOSURE

The present disclosure is directed to a bale spear device which comprises a first upper plate having a first aperture, a second upper plate having a second aperture, an upper cross tube for connecting the first upper plate and the second upper plate together in a spaced apart arrangement, a first lower plate connected to the upper cross tube, a second lower plate connected to the upper cross tube, a lower cross tube for connecting the first lower plate and the second lower plate together in a spaced apart relationship, a socket extending out of the upper cross tube, a spear having a tip end and a socket end with the tip end for insertion into the second aperture of the second upper plate and the socket end for insertion into the first aperture of the first upper plate, and a locking device for locking the socket end of the spear in the first aperture of the first upper plate.

In another embodiment of the present disclosure a bale spear device comprises a first upper plate having a first aperture, a second upper plate having a second aperture, an upper cross tube for connecting the first upper plate and the second upper plate together in a spaced apart arrangement, a first lower plate connected to the upper cross tube, a second lower plate connected to the upper cross tube, a lower cross tube for connecting the first lower plate and the second lower plate together in a spaced apart relationship, a socket extending out of the upper cross tube, and a spear having a tip end and a socket end with the tip end for insertion into the second aperture of the second upper plate and the socket end for insertion into the first aperture of the first upper plate.

In yet another embodiment, a bale spear device comprises a first upper plate having a first pair of apertures, a second upper plate having a second pair apertures, an upper cross tube for connecting the first upper plate and the second upper plate together in a spaced apart arrangement, a first lower plate connected to the upper cross tube, a second lower plate connected to the upper cross tube, a lower cross tube for connecting the first lower plate and the second lower plate together in a spaced apart relationship, a pair of sockets extending out of the upper cross tube, a pair of spears with each spear having a tip end and a socket end with the tip end for insertion into one of the pair of the second pair of apertures of the second upper plate and the socket end for insertion into one of the pair of the first pair of apertures of the first upper plate, and a pair of locking devices for locking the socket ends of the spears in the first pair of apertures of the first upper plate.

In still another embodiment of the present disclosure, a bale spear device comprises a first upper plate having a first aperture, a second upper plate having a second aperture, an upper cross tube for connecting the first upper plate and the second upper plate together in a spaced apart arrangement, a socket extending out of the upper cross tube, a spear having a tip end and a socket end with the socket end for insertion into the first aperture of the first upper plate, and a locking bracket comprising a first arm having an aperture and a second arm having an oval shaped opening with the oval shaped opening for receiving the socket end of the spear therein and the aperture in the first arm for alignment with the first aperture of the first upper plate.

In light of the foregoing comments, it will be recognized that the present disclosure provides a bale spear device that incorporates a storage device for storing a spear during transportation of the bale spear device.

The present disclosure provides a bale spear device that can be easily employed with highly reliable results to transport the bale spear device in a transport state to be fully assembled when needed.

The present disclosure further provides a bale spear device that is capable of storing the correct number of spears for the bale spear device.

The present disclosure provides a bale spear device that is easy to use and operate and does not require any advanced or special training or special tools to assemble the bale spear device.

The present disclosure provides a bale spear device that has a locking device that securely holds one or more spears in the bale spear device during transportation of the bale spear device and the locking device can be discarded once the bale spear device is assembled.

The present disclosure is also directed to a bale spear device that can be shipped, stored, and retailed in a compact form.

The present disclosure further provides a bale spear device that has a low cost of manufacturing so that farmers, ranchers, cooperatives, haulers, elevators, yards, and depots can readily purchase the bale spear device through existing retail outlets.

These and other advantages of the present disclosure will become apparent to those skilled in the art after considering the following detailed specification in conjunction with the accompanying drawings.

DETAILED DESCRIPTION OF PREFERRED EMBODIMENTS

Figure 1:
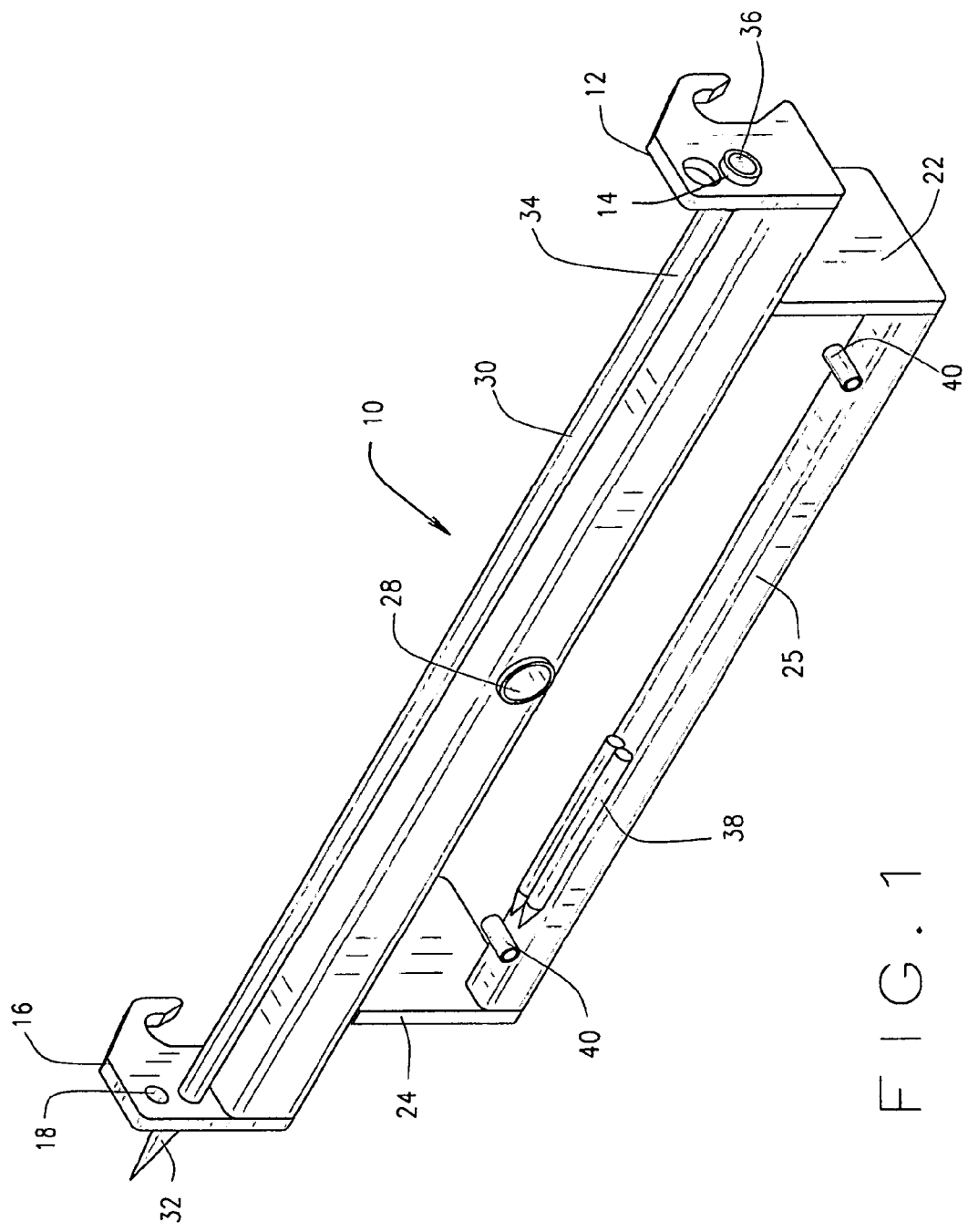
FIG. 1 is a front perspective view of a bale spear device constructed according to the present disclosure.

Referring now to the drawings, wherein like numbers refer to like items, number 10 identifies a preferred embodiment of a bale spear device constructed according to the present disclosure. With reference now to FIG. 1, the bale spear device 10 is shown comprising a first upper plate 12 having a first aperture 14, a second upper plate 16 having a second aperture 18, and an upper cross tube 20 for connecting the first upper plate 12 and the second upper plate 16 together in a spaced apart arrangement. A first lower plate 22 is connected to the upper cross tube 20 and a second lower plate 24 is connected to the upper cross tube 20. A lower cross tube 26 connects the first lower plate 22 and the second lower plate 24 together in a spaced apart relationship. A socket 28 extends out of the upper cross tube 20. A spear 30 has a tip end 32 and a socket end 34 with the tip end 32 for insertion into the second aperture 18 of the second upper plate 16 and the socket end 34 for insertion into the first aperture 14 of the first upper plate 12. A locking device 36 is used for locking the socket end 34 of the spear 30 in the first aperture 14 of the first upper plate 12. As can be appreciated, the spear 30 is stored for transportation of the device 10. Once the device 10 has been delivered, the spear 30 may be removed from the device 10 by unlocking the locking device 36 to remove the socket end 34 from the first aperture 14 and the tip end 32 from the second aperture 18. Once the spear 30 is removed, it may be inserted into the socket 28 and secured therein. The bale spear device 10 may also include a pair of balance spikes 38. The balance spikes 38 are inserted into a pair of sockets 40 provided on the lower cross tube 26.

Figure 2:
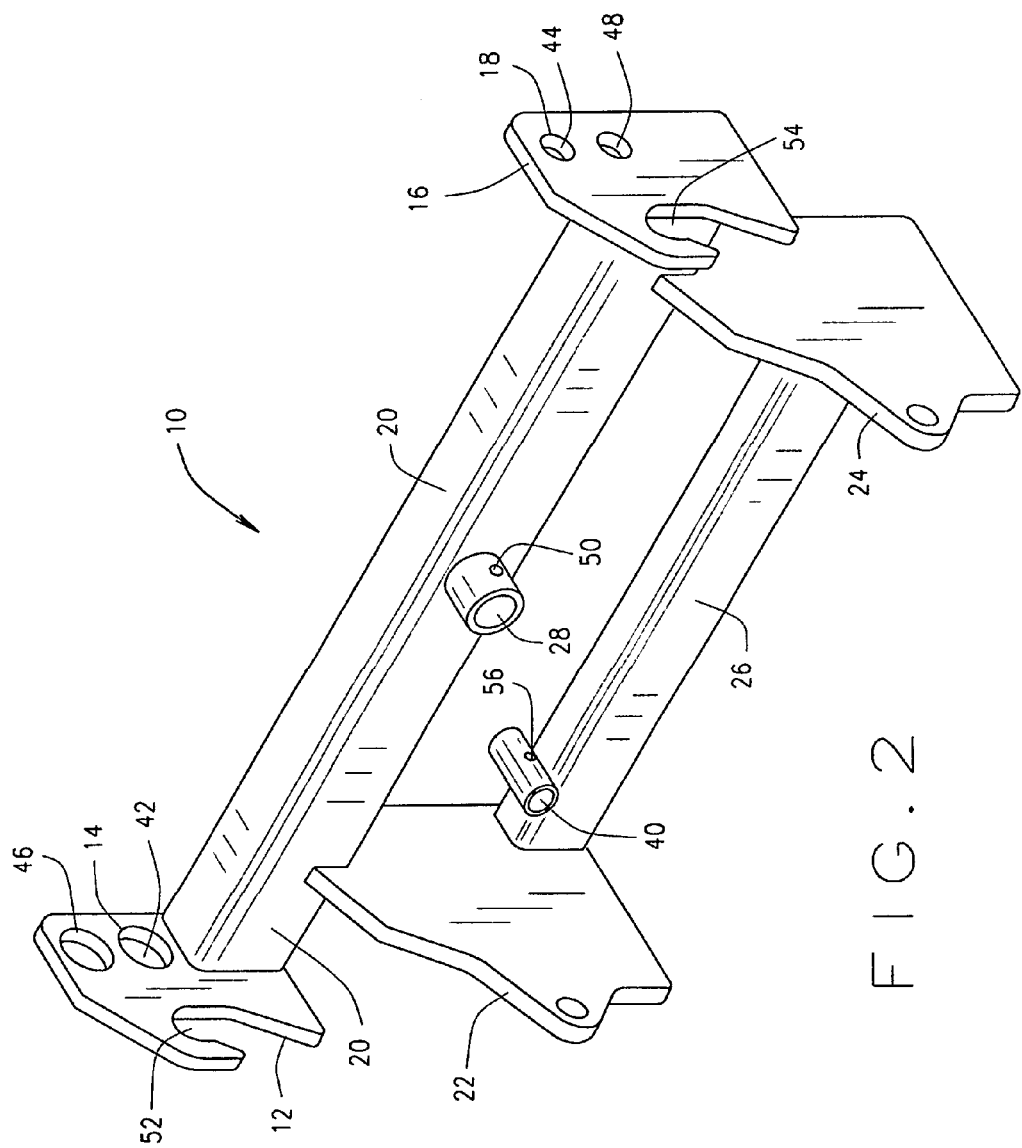
FIG. 2 is an enlarged rear perspective view of a bale spear device constructed according to the present disclosure with a spear removed.

With reference now to FIG. 2, an enlarged rear perspective view of the bale spear device 10 is shown with the spear 30 being removed from the bale spear device 10. The bale spear device is shown comprising the first upper plate 12 having the first aperture 14, the second upper plate 16 having the second aperture 18, and the upper cross tube 20 for connecting the first upper plate 12 and the second upper plate 16 together in a spaced apart arrangement. The first aperture 14 has a diameter 42 and the second aperture 18 has a diameter 44 and the diameter 42 of the first aperture 14 is larger than the diameter 44 of the second aperture 18. The smaller diameter 44 of the second aperture 18 allows the tip end 32 of the spear 30 to be inserted therein. The first upper plate 12 is also shown having another aperture 46 formed therein and the second upper plate 16 also has another aperture 48 provided. The socket 28 has an aperture 50 formed therein, The aperture 50 is used to receive a locking device (not shown) such as a bolt and a nut that are used to lock or secure the spear 30 in place when it is inserted into the socket 28. The first upper plate 12 also has a hook portion 52 and the second upper plate 16 has a hook portion 54.

The first lower plate 22 is connected to the upper cross tube 20 and the second lower plate 24 is connected to the upper cross tube 20. The lower cross tube 26 connects the first lower plate 22 and the second lower plate 24 together in a spaced apart relationship. One of the pair of sockets 40 is shown having an aperture 56 formed therein. The aperture 56 is used to capture a locking device (not shown) such as a bolt and a nut that are used to secure the balance spike 38 in place.

Figure 3:
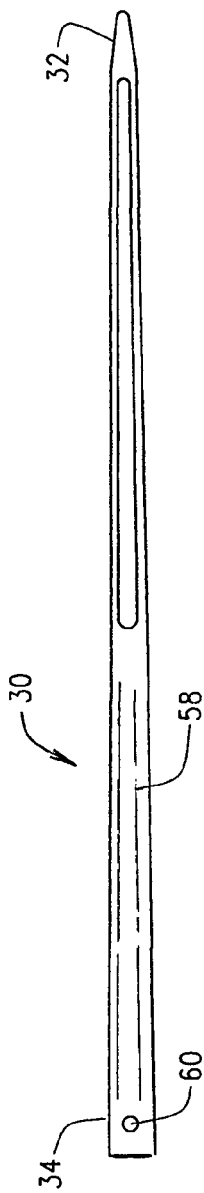
FIG. 3 is a side perspective view of a spear used in the bale spear device of the present disclosure.

FIG. 3 illustrates a side perspective view of the spear 30. The spear 30 has the tip end 32 and the socket end 34. The tip end 32 tapers to a central portion 58 which extends to form the socket end 34. The socket end 34 also has an aperture or opening 60 formed therein that extends through the socket end 34. As will be explained in detail further herein, the aperture 60 is used in combination with the locking device 36 to secure the spear 30 in the bale spear device 10 during transportation. The socket end 34, in combination with the locking device 36, fits into the first aperture 14 of the first upper portion 12 to hold or secure the spear 30 in place. The tip end 32 is capable of sliding into the second aperture 18 formed in the second upper portion 16.

Figure 4:
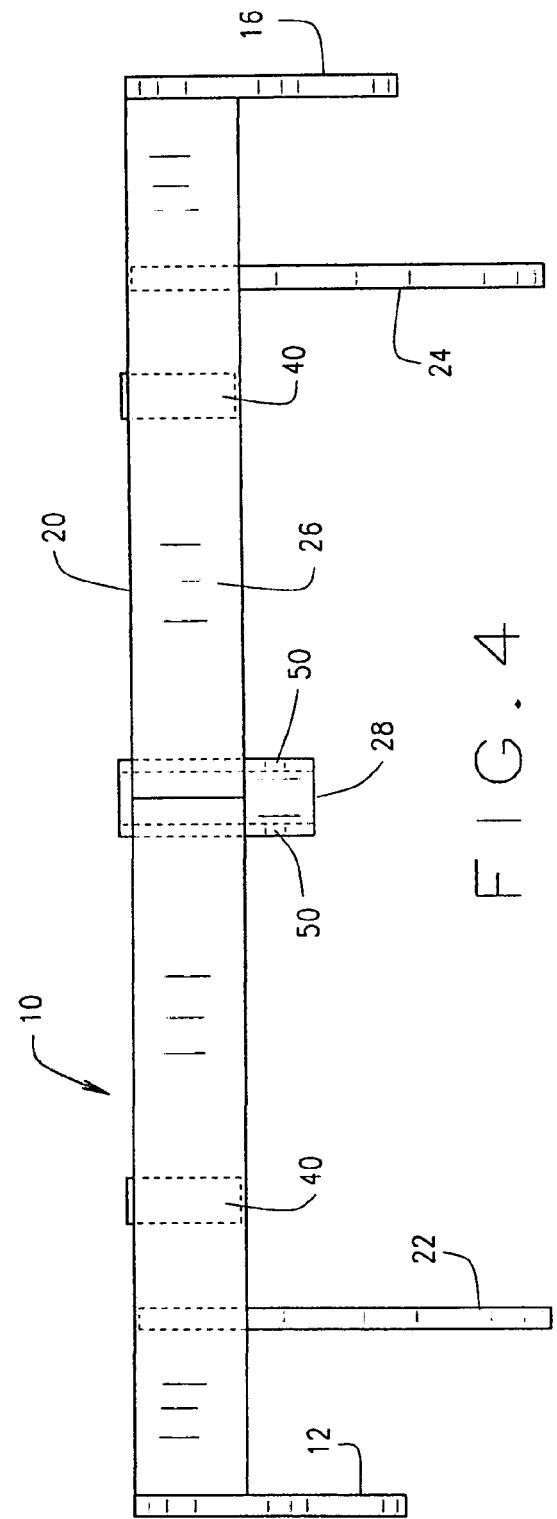
FIG. 4 is a top perspective view of the bale spear device constructed according to the present disclosure shown partially in phantom.

Referring now to FIG. 4, a top perspective view of the bale spear device 10 is shown partially in phantom. The bale spear device 10 has the first upper portion 12 and the second upper portion 16 connected together by the upper cross tube 20. The lower cross tube 26 connected together the first lower portion 22 and the second lower portion 24. The upper cross tube 20 is also connected to the first lower portion 22 and the second lower portion 24. The socket 28 extends through the upper cross tube 20 and is sized and shaped to receive the socket end 34 of the spear 30. The aperture 50 is also shown extending through the socket 28 to show that a bolt may extend there through. For example, the aperture 60 formed in the socket end 34 of the spear 30 may be lined up with the aperture 50 and a bolt may be inserted therein to lock or secure the spear 30 in place. A nut (not shown) may be inserted on an end of the bolt that extends out of the aperture 50 of the socket 28 to firmly secure the spear 30 in place. The pair of sockets 40 are attached to the lower cross tube 26.

Figure 5:
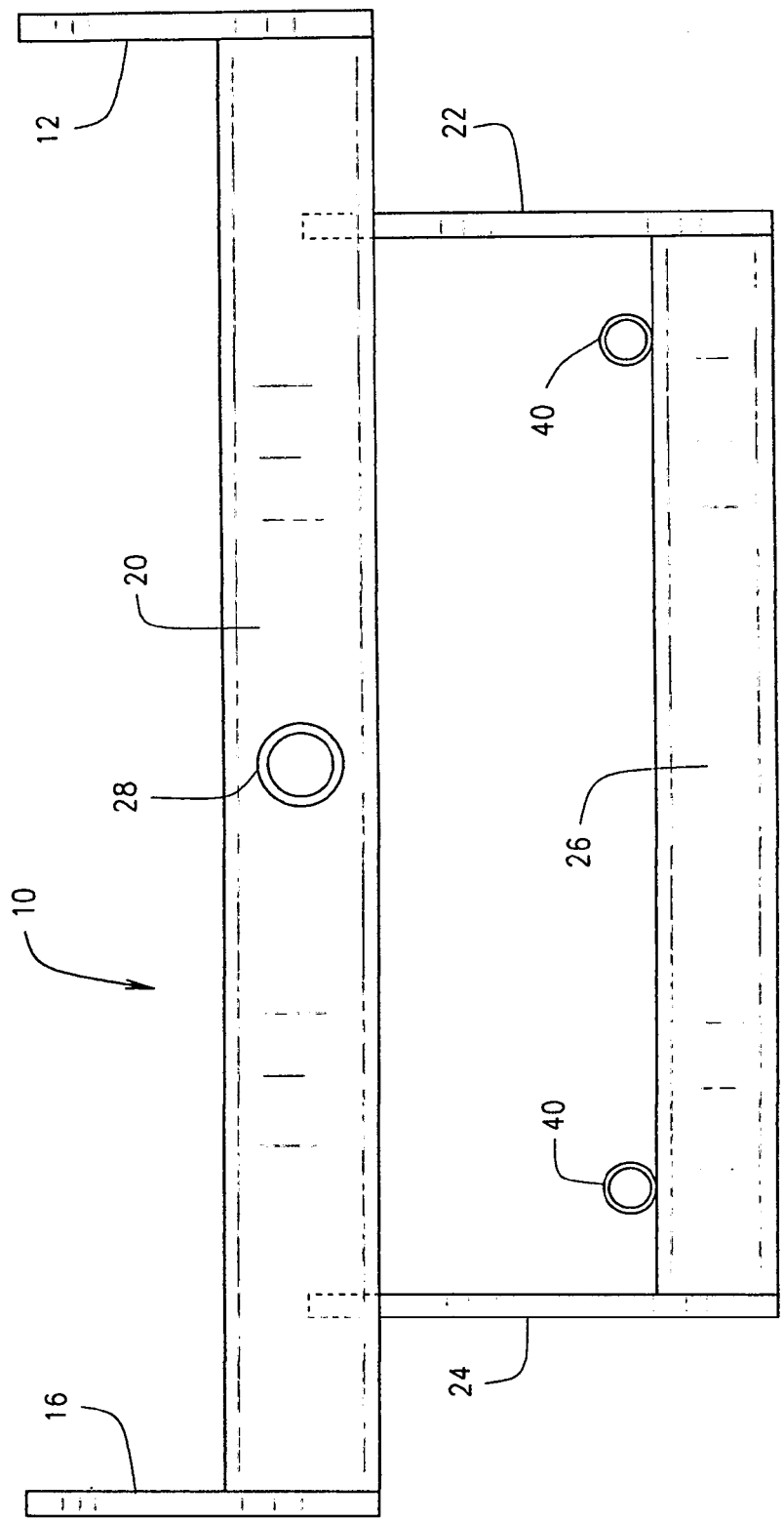
FIG. 5 is a front perspective view of the bale spear device constructed according to the present disclosure shown partially in phantom.

FIG. 5 depicts a front perspective view of the bale spear device 10 shown partially in phantom. The bale spear device 10 has has the first upper portion 12 and the second upper portion 16 connected together by the upper cross tube 20. The lower cross tube 26 connected together the first lower portion 22 and the second lower portion 24. The first upper portion 12 and the second upper portion 16 are perpendicular to the upper cross tube 20. The upper cross tube 20 is also connected to the first lower portion 22 and the second lower portion 24. The first lower portion 22 and the second lower portion 24 are also perpendicular to the upper cross tube 20. The socket 28 extends through the upper cross tube 20 and is adapted to receive the spear 30. The pair of sockets 40 are attached to the lower cross tube 26 and are adapted to receive the balance spikes 38.

Figure 6:
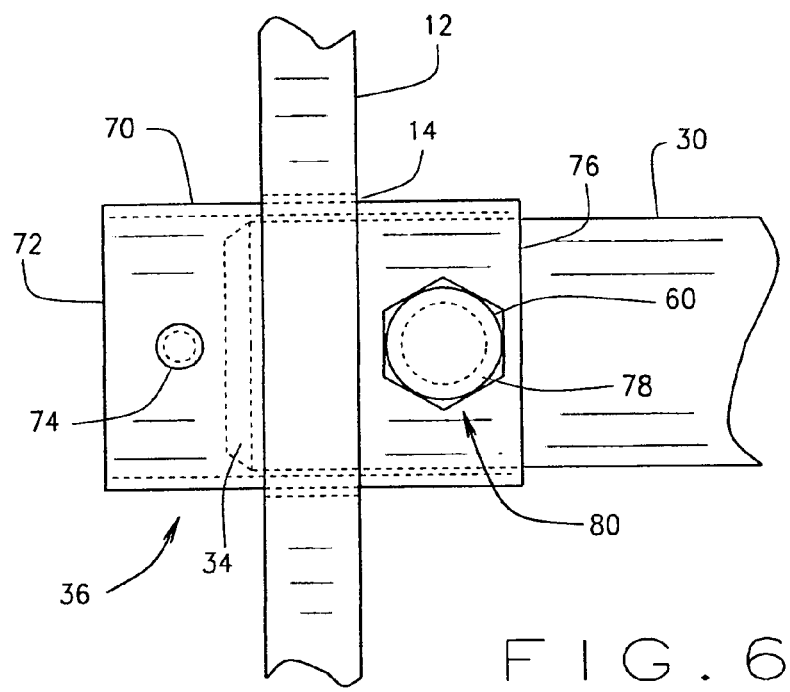
FIG. 6 is a top view of a locking device used in the bale spear device of the present disclosure shown partially in phantom.

With particular reference now to FIG. 6, a top view of the locking device 36 used in the bale spear device 10 of the present disclosure shown partially in phantom. The locking device 36 comprises a hollow retaining collar 70 having a first end 72, a rivet 74 extending out of the first end 72, and a second end 76 having an aperture 78 formed therein. The aperture 78 is used to capture a bolt 80 that slides through the aperture 60 formed in the socket end 34. Although now shown, the bolt 80 extends through the other side of the aperture 78 and a nut is used to lock the bolt 80 in place. In this manner, the socket end 34 of the spear 30 is secured in place in the first aperture 14 in the first upper portion 12. As can be appreciated, the locking device 36 is inserted into the first aperture 14 and the rivet 74 ensures that the collar 70 will not slide through the aperture 14. The socket end 34 is then placed through the second end 76, the apertures 78 and 60 are aligned, and the bolt 80 is inserted there through. Although the locking device 36 has been described, it is also possible and contemplated that the bale spear device 10 may be shipped without use of the locking device 36. In particular, instead of the locking device 36, the bolt 80 is used to secure the spear 30 in place in the first aperture 14.

Figure 7:
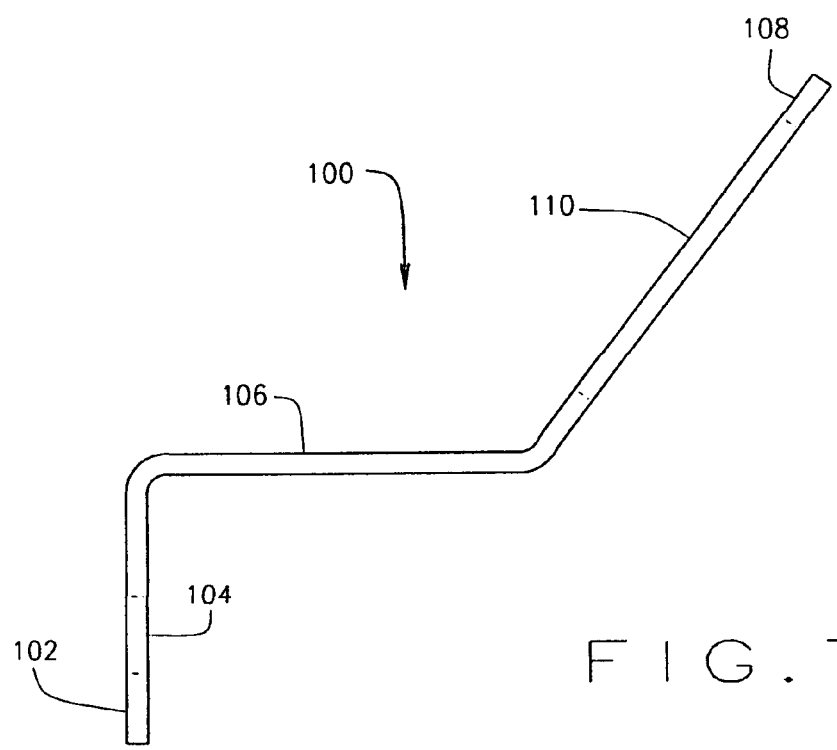
FIG. 7 is a top perspective view of a locking bracket used in the bale spear device of the present disclosure.

FIG. 7 shows a top perspective view of a locking bracket 100 that may be used with another bale spear device (not shown). In some bale spear devices, the spear used is considerably shorter than the spear 30. In this situation, the locking bracket 100 is used. The locking bracket 100 comprises a first arm 102 having a first aperture 104, a second central arm 106, and a third arm 108 having an oval shaped opening 110. The third arm 108 makes a 54° angle, more or less, with the second central arm 106. The oval shaped opening 110 is used to receive a socket end of a spear. The first aperture 104 is used to receive a bolt to secure the first arm 102 to a bale spear device.

Figure 8:
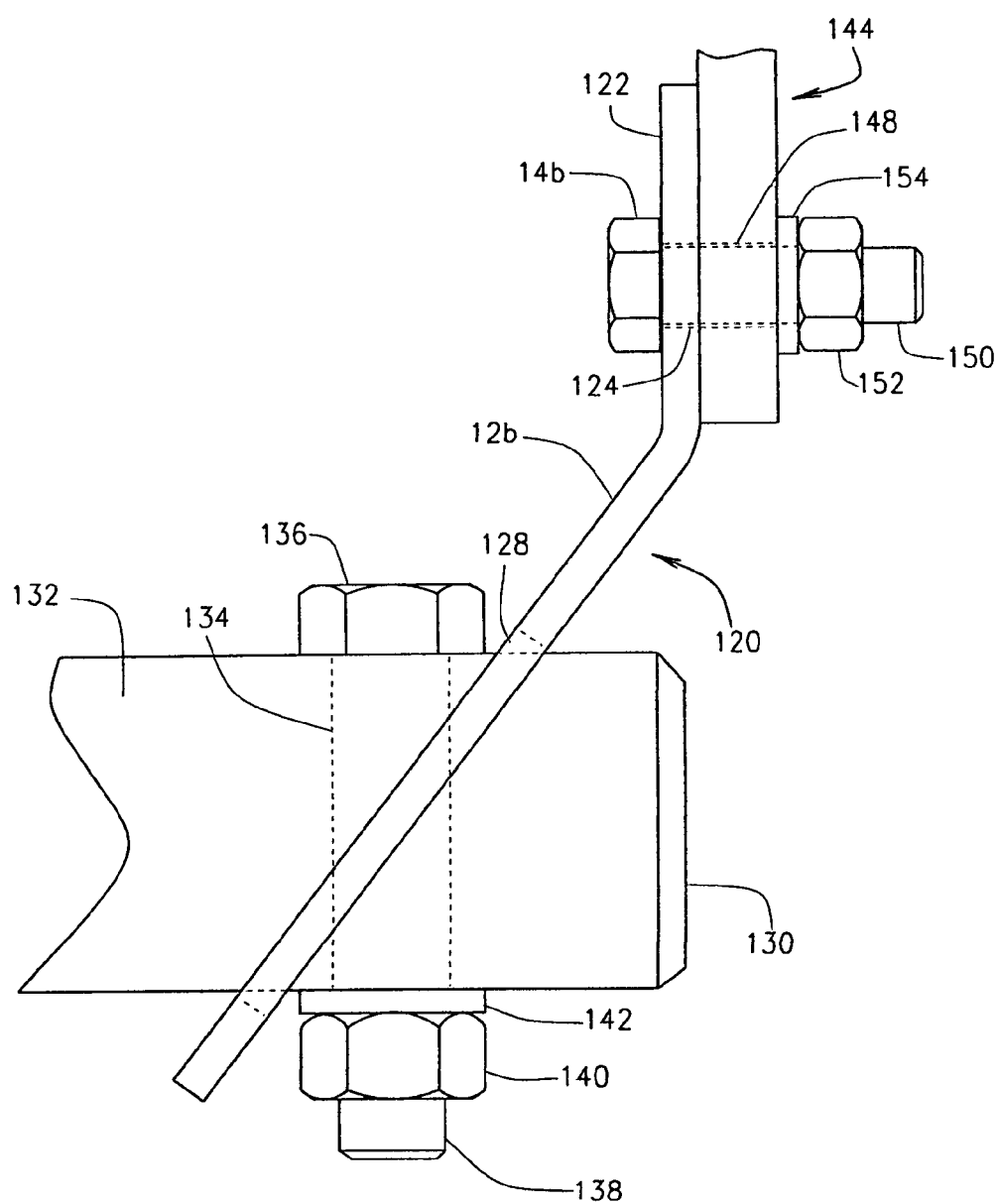
FIG. 8 is a top perspective view of yet another locking bracket used in the bale spear device of the present disclosure.

Referring now to FIG. 8, another embodiment of a locking bracket 120 is shown. The locking bracket 120 comprises a first arm 122 having an aperture 124 and a second arm 126 having an oval shaped opening 128. The second arm 126 makes a 54° angle with the first arm 122. The oval shaped opening 128 is capable of receiving a socket end 130 of a spear 132. The socket end 130 has a channel 134 therein for receiving a bolt 136 through the channel 134 with the bolt 136 having an end 138 that extends out of the socket end 130. A nut 140 and a washer 142 are placed over the end 138 and the nut 140 is threaded in place. This locks the socket end 130 in place with respect to the locking bracket 120. The first arm 122 is secured in place to a bale spear device 144 by use of a bolt 146 inserted through the aperture 124 and an opening 148 formed in the bale spear device 144. The bolt 146 has an end 150 that extends out of the opening 148 and a nut 152 and a washer 154 may be placed over the end 150 to secure the first arm 124 to the bale spear device 144. Although not shown, the bale spear device 144 has another end in which a tip end of the spear 132 is inserted for transporting the bale spear device 144, the spear 132, and the locking bracket 120.

Figure 9:
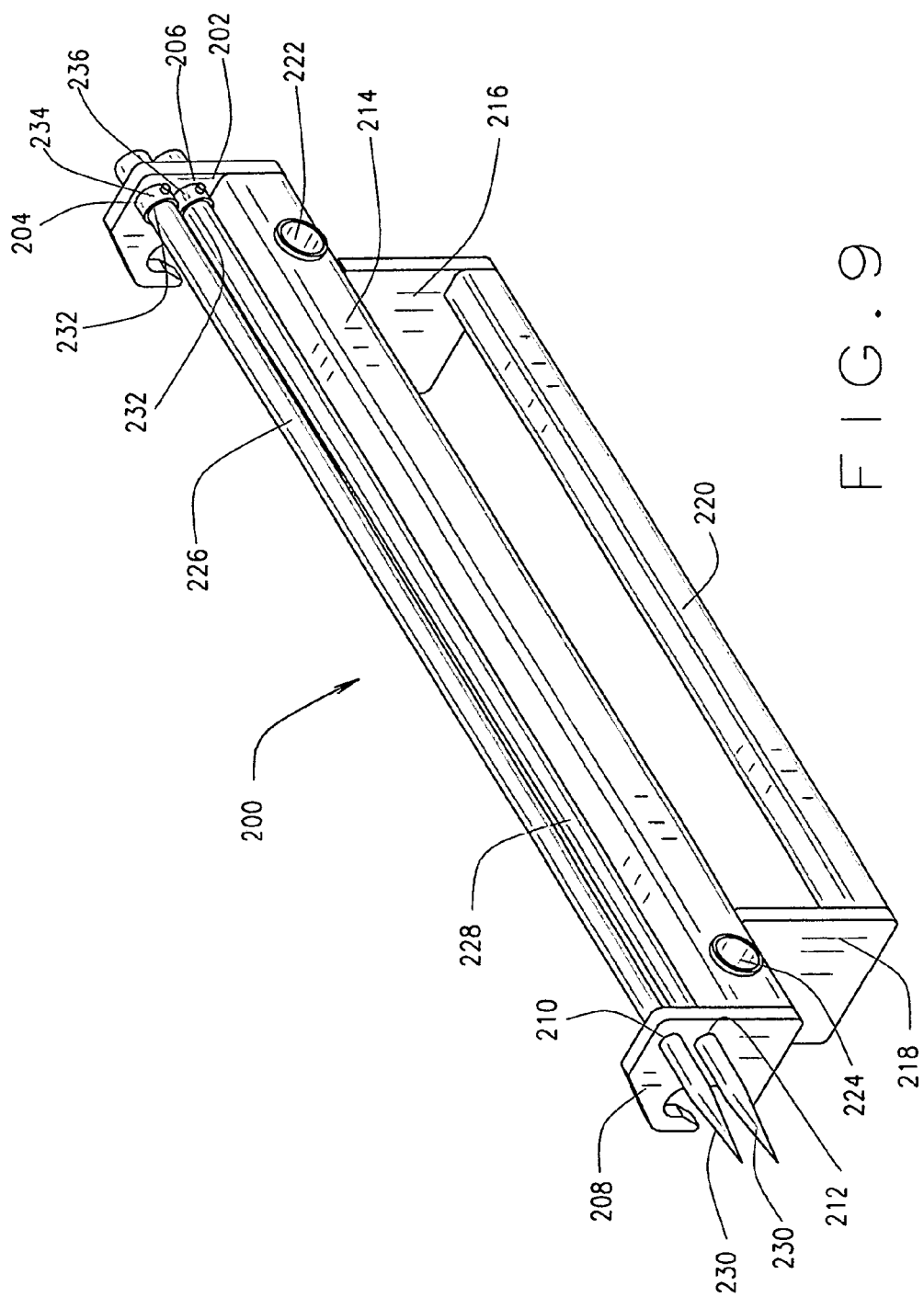
FIG. 9 is a front perspective view of another embodiment of a bale spear device constructed according to the present disclosure.

FIG. 9 illustrates another bale spear device 200 constructed according to the present disclosure. The difference between the bale spear device 200 and the bale spear device 10 being that the bale spear device 200 is also capable of using two spears. The bale spear device 200 comprises a first upper plate 202 having a first pair of apertures 204 and 206, and a second upper plate 208 having a second pair apertures 210 and 212. An upper cross tube 214 connects the first upper plate 202 and the second upper plate 208 together in a spaced apart arrangement. A first lower plate 216 is connected to the upper cross tube 214 and a second lower plate 218 is also connected to the upper cross tube 214. A lower cross tube 220 is provided for connecting the first lower plate 216 and the second lower plate 218 together in a spaced apart relationship. A pair of sockets 222 and 224 extend out of the upper cross tube 214. A pair of spears 226 and 228 with each spear having a tip end 230 and a socket end 232 with the tip end 230 are adapted to be inserted into one of the pair of the second pair of apertures 210 or 212 of the second upper plate 208 and the socket end 232 for insertion into one of the pair of the first pair of apertures 204 or 206 of the first upper plate 202. A first locking device 234 is used to secure the socket end 232 of the spear 226 in the aperture 204 and a second locking device 236 is used to secure the socket end 232 of the spear 228 in the aperture 206. The spears 226 and 228 may be stored for transportation of the device 200. Once the device 200 has been delivered, the spears 226 and 228 may be removed from the device 200 by unlocking the locking devices 234 and 236 to remove the socket ends 232 from the apertures 204 and 206 and the tip ends 230 from the apertures 210 and 212. Once the spears 226 and 228 removed, the spears 226 and 228 may be inserted into the sockets 222 and 224 and secured therein. The bale spear device 200 is fully assembled and may be used to life bales of hay after being attached to a loader or a tractor.

From all that has been said, it will be clear that there has thus been shown and described herein a bale spear device. It will become apparent to those skilled in the art, however, that many changes, modifications, variations, and other uses and applications of the subject bale spear device are possible and contemplated. All changes, modifications, variations, and other uses and applications which do not depart from the spirit and scope of the disclosure are deemed to be covered by the disclosure, which is limited only by the claims which follow.

What is claimed is:

1. A bale spear device comprising:
   a first upper plate having a first aperture;
   a second upper plate having a second aperture;
   an upper cross tube for connecting the first upper plate and the second upper plate together in a spaced apart arrangement;
   a first lower plate connected to the upper cross tube;
   a second lower plate connected to the upper cross tube;
   a lower cross tube for connecting the first lower plate and the second lower plate together in a spaced apart relationship;
   a socket extending out of the upper cross tube;
   a spear having a tip end and a socket end with the tip end for insertion into the second aperture of the second upper plate and the socket end for insertion into the first aperture of the first upper plate; and
   a locking device for locking the socket end of the spear in the first aperture of the first upper plate.

2. The bale spear device of claim 1 wherein the first aperture has a diameter and the second aperture has a diameter and the diameter of the first aperture is larger than the diameter of the second aperture.

3. The bale spear device of claim 1 wherein the locking device comprises a hollow retaining collar having a first end, a rivet extending out of the first end, and a second end having an aperture.

4. The bale spear device of claim 3 wherein the locking device further comprises a bolt and a nut.

5. The bale spear device of claim 1 wherein the spear further comprises an aperture for receiving the locking device.

6. The bale spear device of claim 1 wherein the spear further comprises an aperture and the locking device comprises a hollow retaining collar having a first end, a rivet extending out of the first end, and a second end having an aperture with the aperture of the spear being aligned with the aperture of the locking device.

7. The bale spear device of claim 6 wherein the locking device further comprises a bolt and a nut with the bolt being inserted through the hollow retaining collar and the spear when the aperture of the spear and the aperture of the locking device are in alignment.

8. A bale spear device comprising:
   a first upper plate having a first aperture;
   a second upper plate having a second aperture;
   an upper cross tube for connecting the first upper plate and the second upper plate together in a spaced apart arrangement;
   a first lower plate connected to the upper cross tube;
   a second lower plate connected to the upper cross tube;
   a lower cross tube for connecting the first lower plate and the second lower plate together in a spaced apart relationship;
   a socket extending out of the upper cross tube; and
   a spear having a tip end and a socket end with the tip end for insertion into the second aperture of the second upper plate and the socket end for insertion into the first aperture of the first upper plate.

9. The bale spear device of claim 8 wherein the first aperture has a diameter and the second aperture has a diameter and the diameter of the first aperture is larger than the diameter of the second aperture.

10. A bale spear device comprising:
    a first upper plate having a first pair of apertures;
    a second upper plate having a second pair apertures;
    an upper cross tube for connecting the first upper plate and the second upper plate together in a spaced apart arrangement;
    a first lower plate connected to the upper cross tube;
    a second lower plate connected to the upper cross tube;
    a lower cross tube for connecting the first lower plate and the second lower plate together in a spaced apart relationship;
    a pair of sockets extending out of the upper cross tube;
    a pair of spears with each spear having a tip end and a socket end with the tip end for insertion into one of the pair of the second pair of apertures of the second upper plate and the socket end for insertion into one of the pair of the first pair of apertures of the first upper plate; and
    a pair of locking devices for locking the socket ends of the spears in the first pair of apertures of the first upper plate.

11. The bale spear device of claim 10 wherein each of the first pair of apertures has a diameter and each of the second pair of apertures has a diameter and the diameters of the first pair of apertures are larger than the diameters of the second pair of apertures.

12. The bale spear device of claim 10 wherein each of the locking devices comprises a hollow retaining collar having a first end, a rivet extending out of the first end, and a second end having an aperture.

13. The bale spear device of claim 12 wherein each of the locking devices further comprises a bolt and a nut.

14. The bale spear device of claim 10 wherein each of the spears further comprises an aperture for receiving the locking device.

15. The bale spear device of claim 10 wherein each of the spears further comprises an aperture and each of the locking devices comprises a hollow retaining collar having a first end, a rivet extending out of the first end, and a second end having an aperture with the apertures of the spears being aligned with the apertures of the locking devices.

16. The bale spear device of claim 15 wherein each of the locking devices further comprises a bolt and a nut with each of the bolts being inserted through the hollow retaining collars and the spears when the apertures of the spears and the apertures of the locking devices are in alignment.

17. A bale spear device comprising:
a first upper plate having a first aperture;
a second upper plate having a second aperture;
an upper cross tube for connecting the first upper plate and the second upper plate together in a spaced apart arrangement;
a socket extending out of the upper cross tube;
a spear having a tip end and a socket end with the socket end for insertion into the first aperture of the first upper plate; and
a locking bracket comprising a first arm having an aperture and a second arm having an oval shaped opening with the oval shaped opening for receiving the socket end of the spear therein and the aperture in the first arm for alignment with the first aperture of the first upper plate.

18. The bale spear device of claim 17 wherein the second arm makes a 54° angle with the first arm.

19. The bale spear device of claim 17 further comprising a bolt, a washer, and a nut.

20. The bale spear device of claim 17 wherein the spear further comprises an aperture and the locking bracket further comprises a bolt, a washer, and a nut, with the bolt being inserted into the aperture in the spear for securing the spear to the locking bracket.

* * * * *